United States Patent
Sorensen (10) Patent No.: US 11,272,665 B2
(45) Date of Patent: Mar. 15, 2022

(54) TINED-TUBE AUGER

(71) Applicant: CNH Industrial America LLC, New Holland, PA (US)

(72) Inventor: Douglas Sorensen, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 76 days.

(21) Appl. No.: 16/380,684

(22) Filed: Apr. 10, 2019

(65) Prior Publication Data

US 2019/0313581 A1  Oct. 17, 2019

Related U.S. Application Data (60) Provisional application No. 62/655,868, filed on Apr. 11, 2018.

(51) Int. Cl.
| | | |
|---|---|---|
| A01D 61/00 | (2006.01) | |
| A01D 41/14 | (2006.01) | |
| A01D 41/06 | (2006.01) | |

(52) U.S. Cl.
CPC ........... *A01D 61/004* (2013.01); *A01D 41/06* (2013.01); *A01D 41/14* (2013.01); *A01D 61/002* (2013.01); *A01D 61/008* (2013.01)

(58) Field of Classification Search
CPC .. A01D 61/004; A01D 61/002; A01D 61/008; A01D 89/02; B65G 33/26; B65G 33/08; B65G 65/46
See application file for complete search history.

(56) References Cited

U.S. PATENT DOCUMENTS

| | | | | |
|---|---|---|---|---|
| RE21,571 E | * | 9/1940 | Innes | A01D 89/002 |
| | | | | 56/364 |
| 2,455,905 A | * | 12/1948 | Ronning | A01D 61/008 |
| | | | | 56/124 |
| 2,455,906 A | * | 12/1948 | Ronning | A01D 41/10 |
| | | | | 56/364 |
| 2,529,180 A | | 11/1950 | Oehler | |
| 2,701,634 A | * | 2/1955 | Carroll | A01D 61/008 |
| | | | | 198/518 |
| 2,871,646 A | * | 2/1959 | Heitshu | A01D 75/285 |
| | | | | 56/209 |

(Continued)

FOREIGN PATENT DOCUMENTS

| | | |
|---|---|---|
| DE | 1929279 U | 12/1965 |
| DE | 4329575 A1 | 3/1995 |

(Continued)

OTHER PUBLICATIONS

Partial European Search Report for EP19168533.8, dated Jul. 19, 2019 (12 pages).

*Primary Examiner* — Adam J Behrens
*Assistant Examiner* — Madeline Ivy Runco
(74) *Attorney, Agent, or Firm* — Peter Zacharias; Patrick Sheldrake (57) ABSTRACT

A combine comprising a feeder housing, and an auger for receiving harvested crop. The auger includes an auger tube rotatable around an auger axis, and a tined-tube positioned inside the auger tube and rotatable around a tined-tube axis that is offset from the auger axis, the tined-tube including fingers extending from the tined-tube and protruding through the auger tube to convey the harvested crop to the feeder housing.

22 Claims, 6 Drawing Sheets

(56) References Cited

U.S. PATENT DOCUMENTS

| | | | |
|---|---|---|---|
| 2,895,590 A * | 7/1959 | Snow | A01D 61/008 198/513 |
| 3,142,375 A * | 7/1964 | Albert | A01D 61/008 198/693 |
| 3,451,199 A | 6/1969 | Molzahn | |
| 3,474,602 A * | 10/1969 | Molzahn | A01D 43/00 56/14.4 |
| 3,977,164 A * | 8/1976 | Ashton | A01D 61/00 56/14.5 |
| 4,217,672 A * | 8/1980 | Olivari | E01H 1/045 15/79.1 |
| 4,271,956 A * | 6/1981 | Hutchinson | B65G 65/22 198/613 |
| 4,453,375 A * | 6/1984 | Field | A01D 89/002 56/14.6 |
| 4,539,801 A * | 9/1985 | Field | A01D 61/008 198/613 |
| 4,970,849 A * | 11/1990 | Friesen | A01D 41/10 56/12.4 |
| 5,236,502 A * | 8/1993 | Wadell | A21C 9/04 118/24 |
| 5,293,730 A * | 3/1994 | Bich | A01D 89/002 56/10.2 G |
| 5,464,371 A * | 11/1995 | Honey | A01D 41/14 460/20 |
| 5,620,083 A * | 4/1997 | Vogelgesang | A01D 61/008 198/613 |
| 5,813,205 A * | 9/1998 | Gosa | A01D 61/008 56/341 |
| 6,435,966 B1 * | 8/2002 | Heidjann | A01F 12/305 460/97 |
| 6,986,241 B2 | 1/2006 | Beck | |
| 7,021,455 B2 * | 4/2006 | Nemedi | B02C 18/2266 198/781.01 |
| 7,392,646 B2 * | 7/2008 | Patterson | A01D 61/008 198/613 |
| 7,401,457 B2 | 7/2008 | Bich et al. | |
| 7,426,819 B2 | 9/2008 | Bich et al. | |
| 7,937,921 B2 * | 5/2011 | Lohrentz | A01D 61/004 56/294 |
| 9,392,747 B2 * | 7/2016 | Patterson | A01D 61/008 |
| 9,591,806 B2 * | 3/2017 | Farley | A01D 89/002 |
| 9,872,436 B2 * | 1/2018 | Mossman | A01D 41/02 |
| 2009/0301049 A1 * | 12/2009 | Thompson | A01D 57/02 56/14.6 |
| 2010/0212277 A1 | 8/2010 | Marrs | |

FOREIGN PATENT DOCUMENTS

| | | | |
|---|---|---|---|
| EP | 2962541 A1 | 1/2016 | |
| EP | 3064053 A1 * | 9/2016 | A01D 61/008 |
| EP | 3064053 A1 | 9/2016 | |
| NL | 7510784 A * | 3/1976 | A01D 87/0038 |

* cited by examiner

TINED-TUBE AUGER

FIELD

The disclosure relates to a tined-tube auger of a combine. The tined-tube conveys cut crop into the combine for further processing.

BACKGROUND

Harvesters (e.g. combines) are vehicle that harvest crops. Operations performed by these combines include cutting and conveying the cut crop into a feeder housing for further processing. An auger having a finger shaft with tines conveys the crop into the feeder housing. The tines on the finger shaft, however, tend to pull some of the cut crop over the top of the auger, rather than conveying the crop towards the feeder housing. This leads to inefficient feeding of the cut crop into the combine.

SUMMARY

An embodiment includes a combine comprising a feeder housing, and an auger for receiving harvested crop. The auger includes an auger tube rotatable around an auger axis, and a tined-tube positioned inside the auger tube and rotatable around a tined-tube axis that is offset from the auger axis. The tined-tube includes fingers extending from the tined-tube and protruding through the auger tube to convey the harvested crop to the feeder housing.

An embodiment includes a tined-tube auger comprising an auger tube rotatable around an auger axis, and a tined-tube positioned inside the auger tube and rotatable around a tined-tube axis that is offset from the auger axis. The tined-tube includes fingers extending from the tined-tube and protruding through the auger tube to convey harvested crop.

DETAILED DESCRIPTION

Aspects of the disclosure provide an auger for a combine. The auger includes a tined-tube (e.g., a tube with stationary tines) rotating inside an auger tube. The tined-tube rotates along an axis offset from the auger tube. As the auger tube rotates, the tines (e.g., protruding fingers) extend and retract from/into the auger tube to provide efficient feeding of cut crop into the feeder housing.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1:
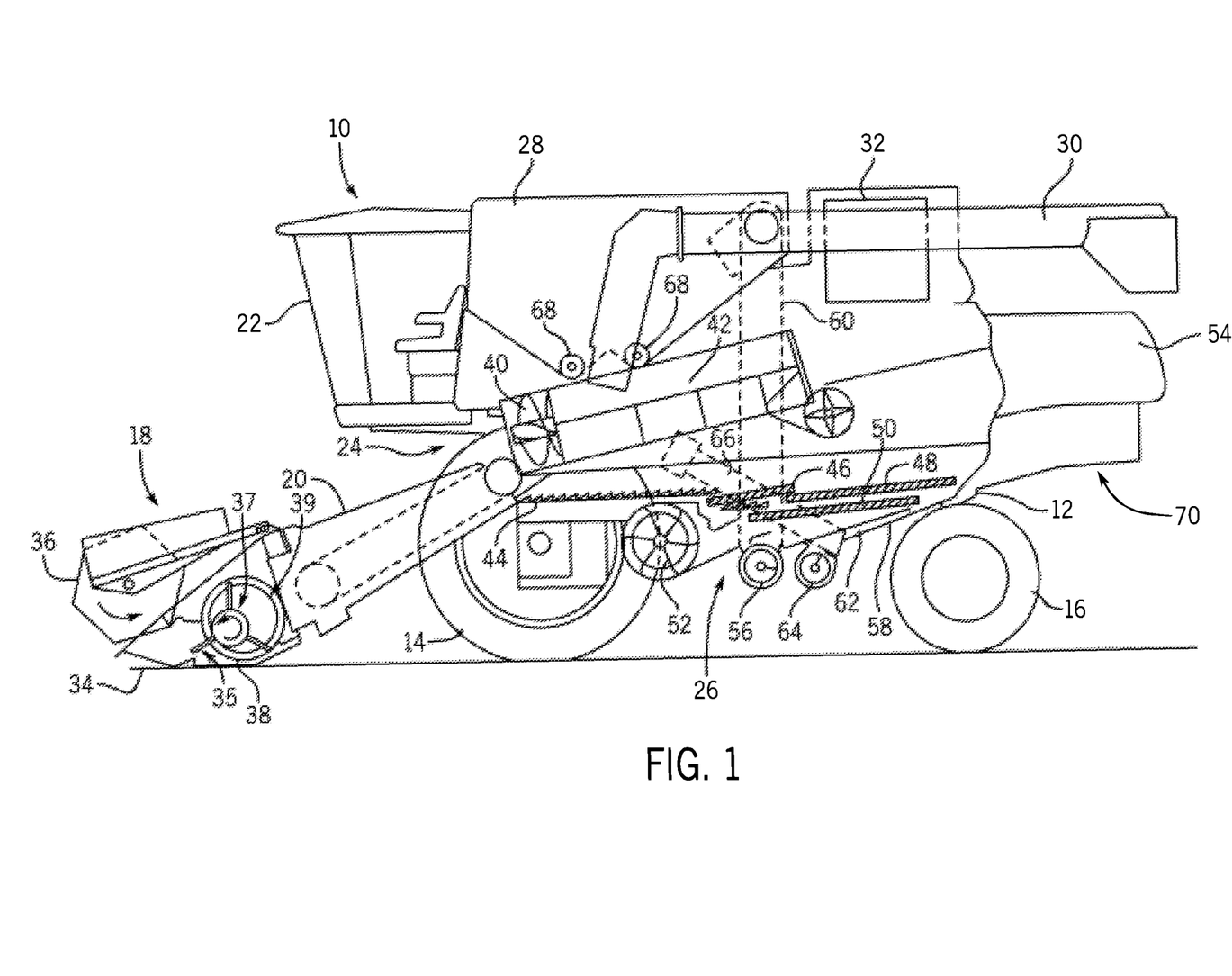
FIG. 1 is a side view of a combine, according to an embodiment of the disclosure.

Referring now to the drawings, and more particularly to FIG. 1, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a tined-tube auger 38 (e.g. rotating counter clockwise as shown in FIG. 1) feeds the severed crop laterally inwardly from each side toward feeder housing 20 for further processing. Tines 35 on a tined-tube 37 extend and retract from/into an auger tube 39 to provide efficient feeding of cut crop into the feeder housing. Further details of tined-tube auger 38 described with respect to later figures. Feeder housing 20 then conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like (i.e. MOG) are discharged from the rear of combine 10. Smaller elements of crop material including grain and non-grain crop material (i.e. MOG), including particles lighter than grain, such as chaff, dust and straw, are discharged through perforations of concave 42.

Grain separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10. The non-grain crop material proceeds through a residue handling system 70 which includes a chopper, a chopper pan, counter knives, a windrow door and a residue spreader, etc.

Figure 2:
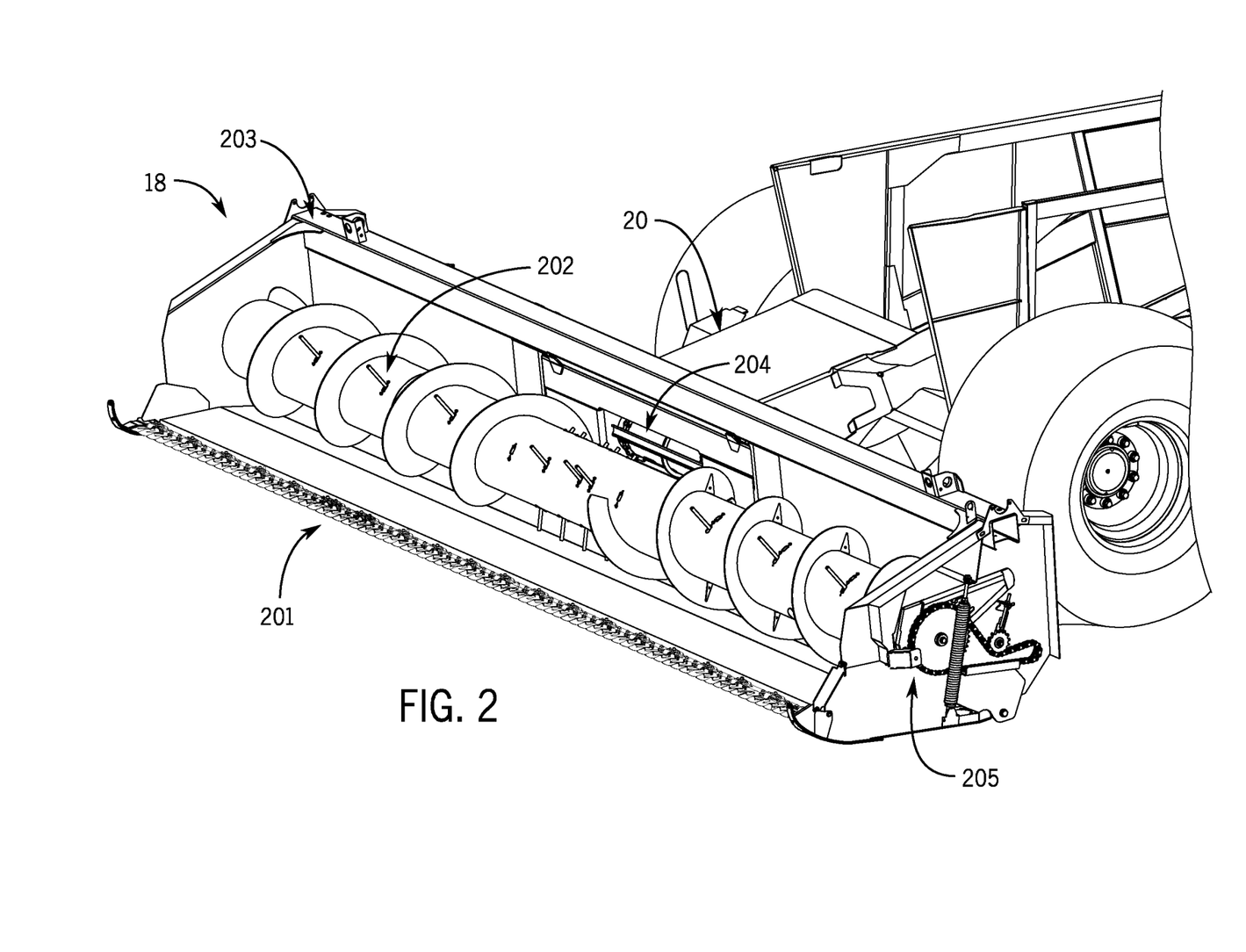
FIG. 2 is a perspective view of the header of the combine, according to an embodiment of the disclosure.

FIG. 2 is a close-up perspective view of header 18 which includes housing 203 supporting sickle 201 for cutting crop above the earth, and having a feeder housing opening 204 for feeding the cut crop into the feeder housing. Header 18 also includes auger 202 mounted within header housing 203 on respective ends. At least one end of auger 202 is mechanically connected to drive train 205. During operation, drive train 205 rotates auger 202 such that auger 202 pulls the cut crop from sickle 201 and feeds the cut crop into feeder housing opening 204 for further processing. Drive train 205 may include a geared mechanism that is driven by at least one of an internal combustion engine (not shown) of the combine, a hydraulic motor (not shown), an electric motor (not shown), or the like.

Figure 3:
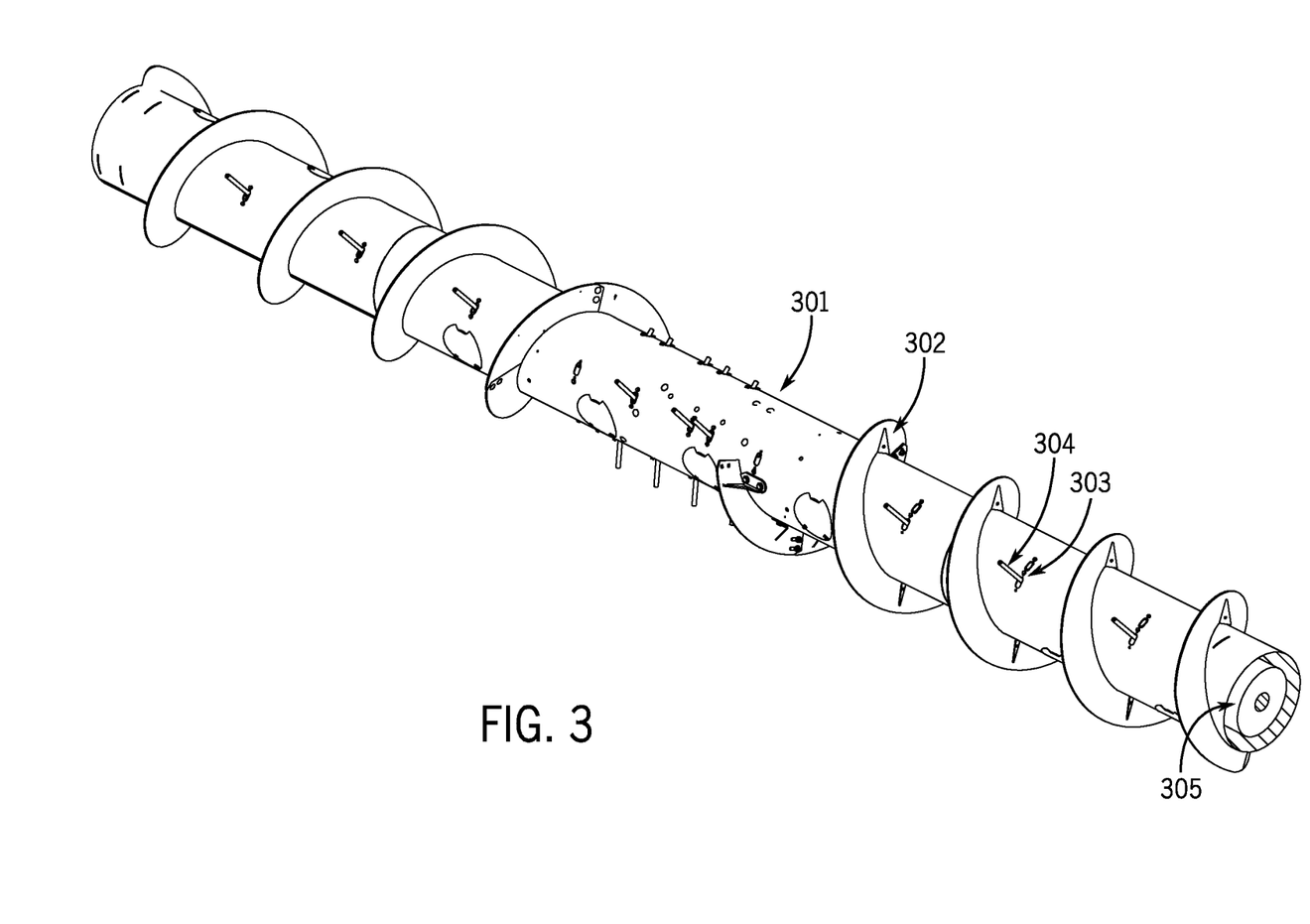
FIG. 3 is a perspective view of the tined-tube auger of the combine, according to an embodiment of the disclosure.

FIG. 3 shows a close-up perspective view of the tined-tube auger from FIG. 2. As shown in FIG. 3, the tined-tube auger includes auger tube 301 having auger flights 302 positioned on its outer circumference. Auger flights 302 may be spiral flights that extend in a direction generally perpendicular to the outer circumference of auger tube 301. Flights 302 convey the cut crop from the ends of auger tube 301 to the middle of auger tube 301 where feeder housing opening 204 is located. Tined-tube 305 is positioned inside auger tube 301 and extends axially along the length of auger tube 301 (e.g. tined-tube 305 is generally the same length as auger tube 301). Tined-tube 305 is a tube having protruding tines (e.g. fingers) 304. During operation (e.g. as the tined-tube auger rotates), tines 304 of tined-tube 305 extend and retract from/into auger tube 301 via holes 303 positioned on the outer circumference of the auger tube 301.

Figure 4A:
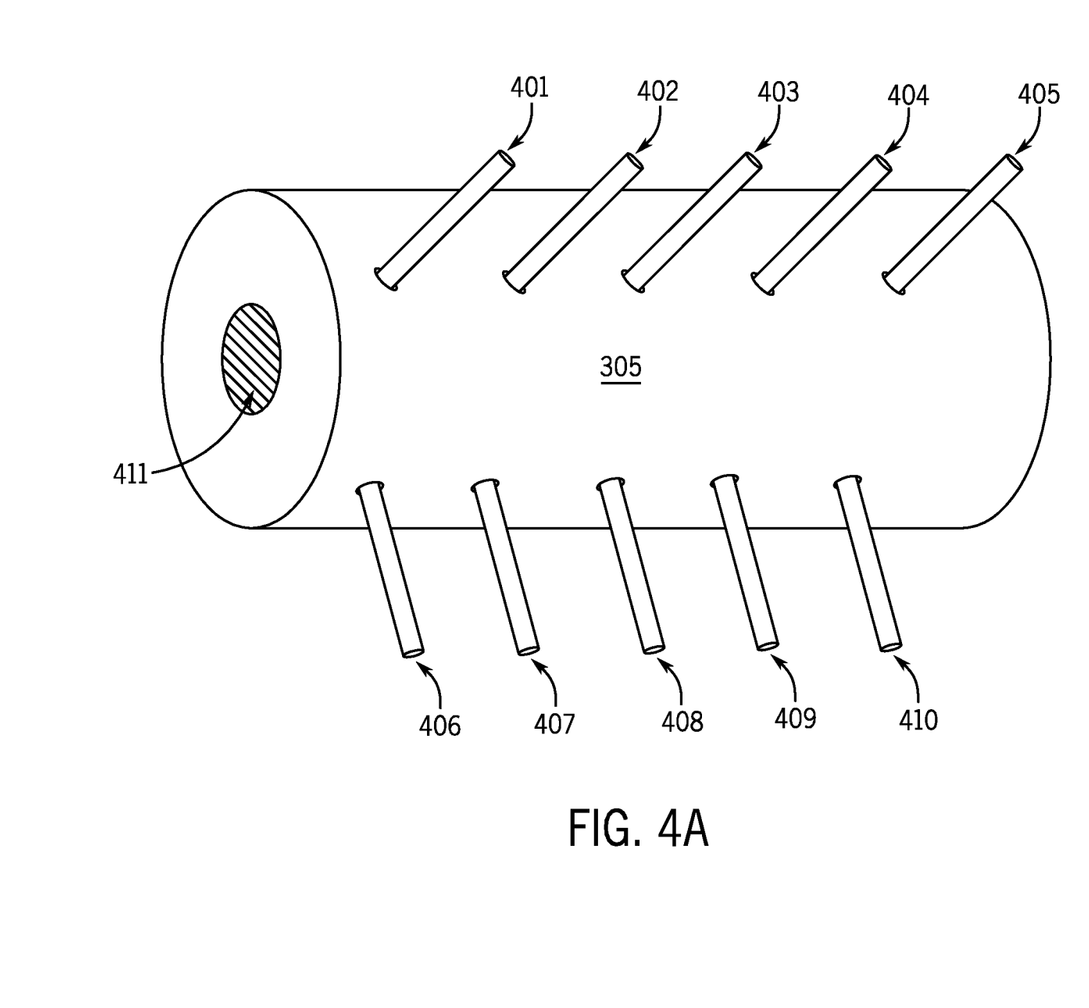
FIG. 4A is a perspective view of a tined-tube having tines aligned in rows spaced apart by a set angle, according to an embodiment of the disclosure.

A view of tined-tube 305 is shown in FIG. 4A. Tined-tube 305 is a hollow tube made of metal or the like, that includes a first set (row) of tines 401-405 and a second set (row) of tines 406-410 fixed to its outer circumference. Although not shown, tined-tube 305 also includes a third set of tines on the side that is not visible in the figure. In this configuration, the three sets of tines are separated by 1200 around the outer circumference of tined-tube 305. The tines could be molded directly into tined-tube 305 or fixed to tined-tube 305 using any number of techniques including but not limited to welding.

Figure 4B:
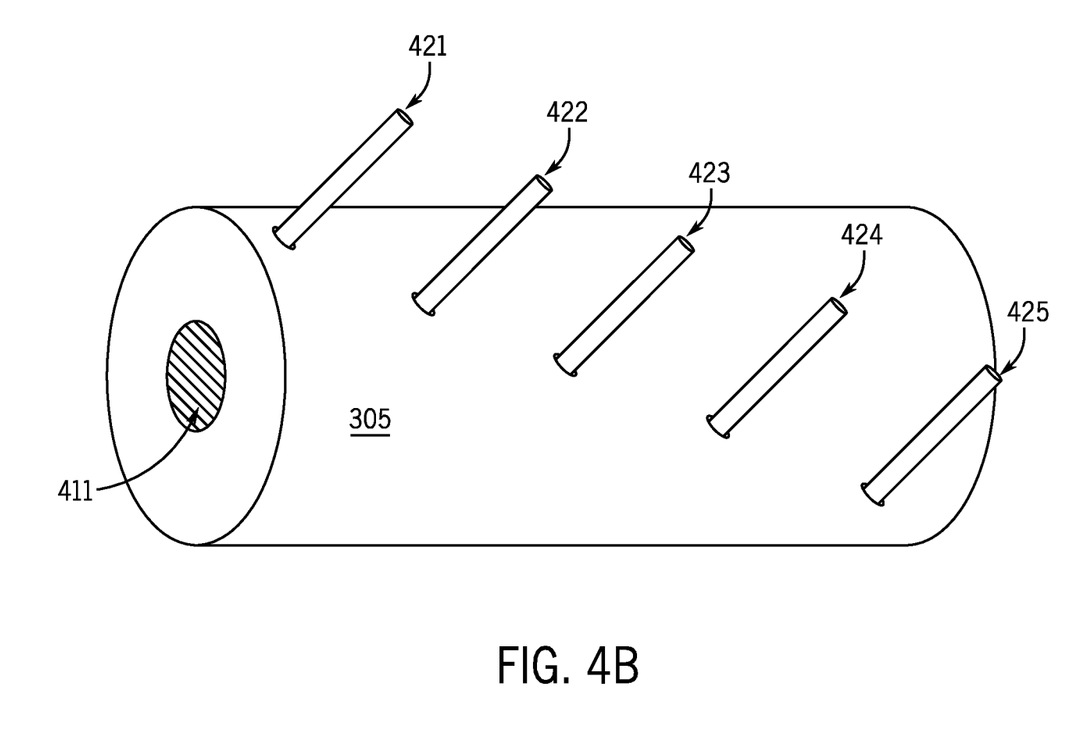
FIG. 4B is a perspective view of a tined-tube having tines aligned in a spiral pattern, according to an embodiment of the disclosure.

As shown in FIGS. 4A and 4B, tined-tube 305 also includes bearings 411 on one end. Although not shown, tined-tube 305 also includes a second set of bearings on the other end that is not visible in the figure. In practice, tined-tube 305 is mounted to the header housing 203 via these bearings. This configuration allows tined-tube 305 to be freely rotatable within the auger tube. "Freely rotatable" means tined-tube 305 rotates if acted on by a force. In one example, this force is applied by auger tube 301 (e.g., driven by a drive train, auger tube 301 pushes against the tines causing tined-tube 305 to rotate).

The configuration shown in FIG. 4A is one possible configuration for the tines on tined-tube 305. The number, positioning and spacing of the tines can vary. One such variation is shown in FIG. 4B, where tined-tube 305 is shown to include tines 421-425 fixed to its outer circumference in a spiral pattern. Although not shown in FIG. 4B, the spiral pattern may travel around the entire circumference of tined-tube 305 (e.g. the tines may be positioned to spiral from the front side of tined-tube 305 shown in the figure to the back side of tined-tube 305 not shown in the figure).

One benefit to positioning the fingers of tined-tube 305 in the row and spiral configurations described above, is that the full extension position of the auger finger is less than 1800 from the full retraction position of the auger finger. This allows the fingers to "let go" of the crop before they pass feeder opening 204 and avoid carrying the crop over the top of the auger, even if the fingers are "sweeping the floor" of header 18. This "let go" action is described in detail with reference to FIG. 5.

Figure 5:
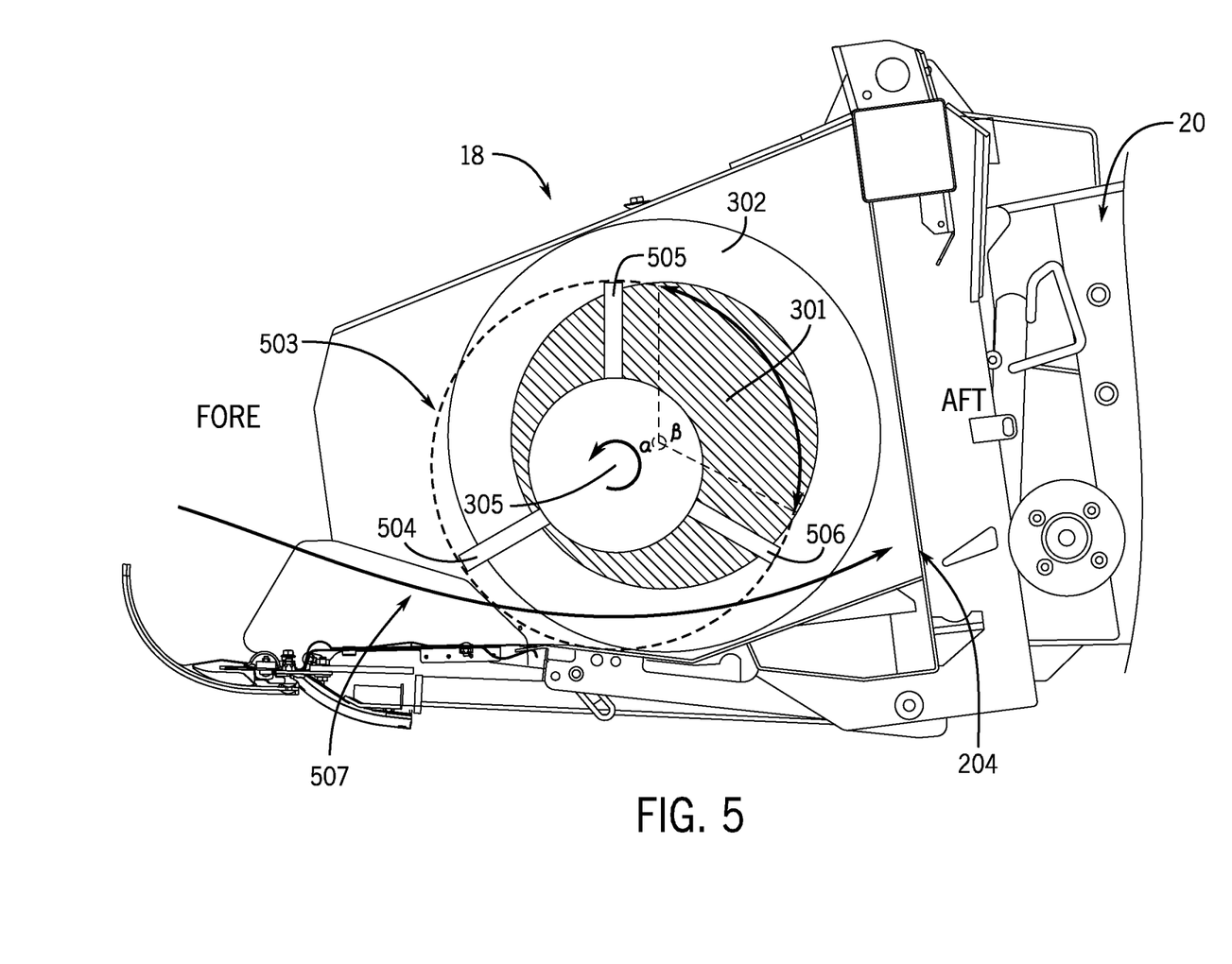
FIG. 5 is a side view of the tined-tube auger of the combine showing the travel paths of tines, according to an embodiment of the disclosure.

FIG. 5 is a side view of tined-tube 305 mounted in auger tube 301 of the combine. As shown in FIG. 5, tined-tube 305 includes three sets of tines 504, 505 and 506 positioned 1200 from one another around the outer circumference of tined-tube 305. It is also shown in FIG. 5 that tined-tube 305 is mounted on a rotational axis that is offset from the rotational axis of auger tube 301 (e.g. the rotational axis of tined-tube 305 is closer to the fore of the header housing, whereas the rotational axis of auger tube 301 is closer to the Aft of the header housing). This offset can be set based on various factors including but not limited to the diameter of the auger tube 301, the diameter of tined tube-301 and the length of the tines.

It is noted that tined-tube 305 is configured to have a smaller diameter than auger tube 301. For example, the diameter of tined-tube 305 may be half the diameter of auger tube 301. This configuration allows tined-tube 305 to rotate at more revolutions per-minute (RPM) than auger tube 301, and allows the tines of tined-tube 305 to retract into auger tube 301.

During operation, the drive train (not shown) rotates auger tube 301 having auger flights 302 in the counter-clockwise direction shown. As auger tube 301 rotates, it imparts a force (via holes) to at least one of tines 504-506 causing tined-tube 305 to rotate in the same counter-clockwise direction as auger tube 301. As tined-tube 305 rotates within auger tube 301, tines 504-506 extend and retract from/into auger tube 301 via the holes. In the rotational position shown in FIG. 5, tine 504 is fully extended from auger tube 301, while tines 505 and 506 are partially extended from auger tube 301.

As described above, tined-tube 305 is positioned closer to the fore of the header housing such that the tines extend as they rotate towards the fore of the header, and then retract as they rotate towards the aft of the header. For example, as a tine is rotated to the position of tine 504 (towards the fore of the header housing), it becomes fully extended (i.e., the majority of the tine is protruding from the auger tube). This full extension allows the tine to grab the cut crop. As the tine 504 rotates, it sweeps the cut crop under auger tube 301 and towards feeder housing opening 204 as shown by arrow 507. As tine 504 performs this sweeping action, it begins to retract into auger tube 301. For example, when the tine reaches the position of tine 506 it is shown that only a portion of the tine is still protruding from auger tube 301. Once the tine reaches a certain position towards the aft of the header housing, the tine becomes fully retracted inside auger tube 301. The full retraction of the tines as they reach the aft part of the header housing is beneficial, in that cut crop collected by the auger is not pulled up and over the top of auger tube 301 towards the fore of the header housing.

For sake of clarity, the travel paths of tines 504-506 are represented by circle 503. When the tines are located at roughly 8 o'clock, they are fully extended from auger tube 301. As the tines rotate in the counter clockwise direction, they begin to retract, until they reach roughly 4 o'clock where they are fully retracted inside auger tube 301. The tines remain retracted inside the auger tube until they are rotated to roughly 12 o'clock, where they once again begin to extend from auger tube 301. Thus, as illustrated in FIG. 5, the tines are retracted over an angular portion β of their travel paths, and are extended over an angular portion α of their travel paths. In an exemplary embodiment, α is greater than β, e.g., greater than 180°. In another exemplary embodiment, α is 120°, and R is 240°. The retracted path of the tines is shown as a solid arrow along circle 503.

The above-described rotational action is repeated with every revolution of auger tube 301 such that the tines extend towards the fore of the header to grab the cut crop and sweep it under auger tube 301 towards feeder housing opening 204, and then retract towards the aft of the header so as to avoid propelling collected crop over the top of the auger tube. This results in a more efficient configuration for collecting cut crop and feeding the cut crop into the feeder housing.

Although the disclosure is illustrated and described herein with reference to specific embodiments, the disclosure is not intended to be limited to the details shown. Rather various modifications may be made in the details within the scope and range of equivalence of the claims and without departing from the disclosure.

For example, the diameter of the tined-tube, the axial offset between the tined-tube and auger tube, the number of tines on the tined-tube, the position of the tines on the tube, the length of the tines on the tined-tube are all configurable depending on various factors including but not limited to header housing dimensions, the type of crop being harvested and cost of production.

The invention claimed is:

1. A combine comprising:
  a feeder housing; and
  an auger for receiving harvested crop, the auger including:
  an auger tube rotatable around an auger axis, and
  a tined tube substantially the same length as the auger tube positioned inside the auger tube and rotatable around a tined-tube axis that is offset from the auger axis, the tined-tube including fingers extending from the tined-tube and protruding through the auger tube to convey the harvested crop to the feeder housing, each finger having a first end that is fixedly and non-moveably connected to the tined-tube and a free end that is opposite the first end,
  wherein the tined-tube is positioned within the auger tube such that the free end of one of the fingers is positioned at a location outside of the auger tube and the free end of another one of the fingers is positioned at a location inside of the auger tube that is radially spaced apart from an exterior surface of the auger tube such that no portion of said another one of the fingers extends outside of the exterior surface of the auger tube.

2. The combine of claim 1,
  wherein the fingers of the tined-tube comprise three sets of fingers, each set axially positioned 120° apart from each other set on the tined-tube, or
  wherein the fingers of the tined-tube are axially positioned in a spiral pattern around the tined-tube.

3. The combine of claim 1,
  wherein the tined-tube is driven by the rotation of the auger tube.

4. The combine of claim 1,
  wherein the fingers extend and retract through the auger tube as the tined-tube rotates.

5. The combine of claim 1,
  wherein the fingers are stationary on the tined-tube.

6. The combine of claim 1,
  wherein the tined-tube includes a first end connected to a header of the combine by a first set of bearings, and a second end connected to the header of the combine by a second set of bearings.

7. The combine of claim 1, wherein, for a single revolution of each free end about the tined-tube axis, the respective free end is positioned inside of the auger tube over a first angular range and the respective free end is positioned outside of the auger tube over a second angular range, wherein the first angular range is less than the second angular range.

8. The combine of claim 1, wherein the auger tube includes auger flights positioned between the tined-tube fingers.

9. The combine of claim 7, wherein the first angular range is about 120 degrees and the second angular range is about 240 degrees.

10. The combine of claim 1,
  wherein at least one finger fully extends when the tined-tube is rotated to a predetermined position with respect to the auger tube.

11. A tined-tube auger comprising:
  an auger tube rotatable around an auger axis, and
  a tined tube substantially the same length as the auger tube positioned inside the auger tube and rotatable around a tined-tube axis that is offset from the auger axis, the tined-tube including fingers extending from the tined-tube and protruding through the auger tube to convey harvested crop, each finger having a first end that is fixedly and non-moveably connected to the tined-tube and a free end that is opposite the first end,
  wherein the tined-tube is positioned within the auger tube such that the free end of one of the fingers is positioned at a location outside of the auger tube and the free end of another one of the fingers is positioned at a location inside of the auger tube that is radially spaced apart from an exterior surface of the auger tube such that no portion of said another one of the fingers extends outside of the exterior surface of the auger tube.

12. The tined-tube auger of claim 11,
  wherein the fingers of the tined-tube comprise three sets of fingers, each set axially positioned 120° apart from each other set on the tined-tube, or
  wherein the fingers of the tined-tube are axially positioned in a spiral pattern around the tined-tube.

13. The tined-tube auger of claim 11,
  wherein the tined-tube is driven by the rotation of the auger tube.

14. The tined-tube auger of claim 11,
  wherein the fingers extend and retract through the auger tube as the tined-tube rotates.

15. The tined-tube auger of claim 11,
wherein the fingers are stationary on the tined-tube.

16. The tined-tube auger of claim 11,
wherein the tined-tube includes a first end connected to a header of the combine by a first set of bearings, and a second end connected to the header of the combine by a second set of bearings.

17. The tined-tube auger of claim 11, wherein, for a single revolution of each free end about the tined-tube axis, the respective free end is positioned inside of the auger tube over a first angular range and the respective free end is positioned outside of the auger tube over a second angular range, wherein the first angular range is less than the second angular range.

18. The tined-tube auger of claim 11,
wherein the auger tube includes auger flights positioned between the tined-tube fingers.

19. The tined-tube auger of claim 17, wherein the first angular range is about 120 degrees and the second angular range is about 240 degrees.

20. The tined-tube auger of claim 11, wherein at least one finger fully extends when the tined-tube is rotated to a predetermined position with respect to the auger tube.

21. The tined-tube auger of claim 1, wherein each finger is either welded or molded to the tined-tube.

22. The tined-tube auger of claim 11, wherein each finger is either welded or molded to the tined-tube.

* * * * *